(12) United States Patent  
Bal et al.

(10) Patent No.: US 9,953,442 B2  
(45) Date of Patent: Apr. 24, 2018

(54) IMAGE CONSTRUCTION WITH MULTIPLE CLUSTERING REALIZATIONS

(71) Applicant: Siemens Medical Solutions USA, Inc., Malvern, PA (US)

(72) Inventors: Harshali Bal, Knoxville, TN (US); Vladimir Y. Panin, Knoxville, TN (US); Michael E. Casey, Louisville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 9 days.

(21) Appl. No.: 15/269,005

(22) Filed: Sep. 19, 2016

(65) Prior Publication Data

US 2017/0084060 A1 Mar. 23, 2017

Related U.S. Application Data

(60) Provisional application No. 62/222,229, filed on Sep. 23, 2015.

(51) Int. Cl.
*G06K 9/40* (2006.01)
*G06T 11/00* (2006.01)
(Continued)

(52) U.S. Cl.
CPC .......... *G06T 11/008* (2013.01); *G06K 9/6223* (2013.01); *G06K 9/6224* (2013.01);
(Continued)

(58) Field of Classification Search
CPC .... G06T 11/008; G06T 11/001; G06T 11/003; G06T 11/005; G06T 11/00; G06T 7/181;
(Continued)

(56) References Cited

U.S. PATENT DOCUMENTS 5,585,637 A 12/1996 Bertelsen et al.
5,608,221 A 3/1997 Bertelsen et al.
(Continued)

OTHER PUBLICATIONS

Bal, Harshali et al., "Parametric Image Formation Using Clustering for Dynamic Cardiac SPECT," IEEE Transactions on Nuclear Science, vol. 50, No. 5, Oct. 2003. pp. 1584-1589.
(Continued)

*Primary Examiner* — Chan S Park
*Assistant Examiner* — Stephen M Brinich (57) ABSTRACT

A method includes overlaying a grid on a set of dynamic PET, SPECT, CT or MR data, so as to define a set of voxels defining a plurality of cluster seeds; extracting a respective time activity curve (TAC) for dynamic PET or SPECT data or time varying signals in the case of dynamic CT or MR data, for each voxel based on the data; selecting a subset of the cluster seeds defined by the grid as initial cluster centroids of a set of clusters; assigning each TAC to a respective cluster in the set of clusters; computing a respective average TAC of each cluster; generating a parametric image based on the respective average TACs for the clusters; repeating the overlaying, determining, selecting, assigning, computing, and generating; and averaging the generated parametric images.

20 Claims, 7 Drawing Sheets

(51) Int. Cl.
*G06K 9/62* (2006.01)
*G06T 7/11* (2017.01)
*G06T 7/181* (2017.01)

(52) U.S. Cl.
CPC .............. *G06K 9/6272* (2013.01); *G06T 7/11* (2017.01); *G06T 7/181* (2017.01); *G06T 2207/10016* (2013.01); *G06T 2207/10104* (2013.01); *G06T 2207/10108* (2013.01); *G06T 2207/20021* (2013.01); *G06T 2207/30016* (2013.01); *G06T 2211/40* (2013.01)

(58) Field of Classification Search
CPC ......... G06T 7/187; G06T 7/194; G06T 7/174; G06T 7/168; G06T 7/11; G06T 7/12; G06T 7/10; G06K 9/6223; G06K 9/622; G06K 9/6221; G06K 9/6222; G06K 9/6224; G06K 9/6272; G06K 9/6271; G06K 9/627; G06K 9/6269; G06K 9/6267; G06K 9/6276; G06K 9/6218; G06F 17/30598; G06F 17/30705; G06F 17/3071; G06F 19/24; G06N 99/005
USPC ........ 382/130–132, 116, 224–225, 254, 260, 382/272
See application file for complete search history.

(56) References Cited

U.S. PATENT DOCUMENTS

| | | | |
|---|---|---|---|
| 8,629,404 | B2 | 1/2014 | Vija |
| 8,872,822 | B2 | 10/2014 | Ekin et al. |
| 9,053,569 | B2 | 6/2015 | Bal et al. |
| 9,204,835 | B2* | 12/2015 | Parsey ............... A61B 5/055 |
| 2007/0290140 | A1 | 12/2007 | Lenox et al. |
| 2008/0228686 | A1* | 9/2008 | Fischer ............... A61B 5/055 |
| | | | 706/46 |
| 2012/0265050 | A1 | 10/2012 | Wang |
| 2012/0275674 | A1 | 11/2012 | Quelever et al. |
| 2015/0160353 | A1 | 6/2015 | Wang et al. |
| 2015/0192685 | A1 | 7/2015 | Griesmer et al. |

OTHER PUBLICATIONS

Wong, Koon-Pong et al., "Segmentation of Dynamic PET Images Using Cluster Analysis," IEEE Transactions on Nuclear Science, vol. 49, No. 1, Feb. 2002, pp. 200-207.

Karakatsanis, Nicolas A. et al., "Dynamic whole-body PET parametric imaging: I. Concept, acquisition protocol optimization and clinical application," Phys. Med. Biol. 58 (2013) 7391-7418.

Segars, W. P. et al., "4D XCAT phantom for multimodality imaging research," Med Phys. Sep. 2010; 37(9): 4902-4915.

* cited by examiner

IMAGE CONSTRUCTION WITH MULTIPLE CLUSTERING REALIZATIONS

CROSS-REFERENCE TO RELATED APPLICATIONS

This application claims the benefit of U.S. Provisional Patent Application No. 62/222,229, filed Sep. 23, 2015, which is incorporated by reference herein in its entirety.

FIELD

This disclosure relates to medical diagnostic image processing.

BACKGROUND

Whole-body parametric positron emission tomography (PET) imaging methods, such as Fludeoxyglucose (FDG) PET, are being considered. A tracer material, such as FDG is injected into the patient, and the uptake behavior is observed over time. Tumors and other regions having uptake behavior distinct from healthy tissue can be distinguished. Dynamic FDG PET imaging along with compartment modelling provides improved discrimination of lesions for scan duration of 90 minutes. However, such long scan durations may cause patient discomfort and motion and may not be a feasible option in a clinical setting. Karakatsanis, N. A. et. al., "Dynamic whole-body PET parametric imaging: I. Concept, acquisition protocol optimization and clinical application," Phys. Med. Bio., vol. 58, p. 7391, 2013, describes a clinically feasible protocol in which whole-body dynamic PET data can be collected for about 30 minutes, starting 10 minutes post injection. Karakatsanis, N. A. et. Al. used Patlak graphical analysis to estimate the metabolic rate of glucose measures that were quantitatively similar to those obtained with 60 minutes scan duration. When Patlak analysis was performed on each voxel (voxel fitting) for short scan duration, the resulting slope parametric image, which represents the metabolic rate of glucose, is noisy.

SUMMARY

A method, comprises (a) overlaying a grid on a set of dynamic positron emission tomography (PET), single photon emission computed tomography (SPECT), computed tomography (CT) or magnetic resonance (MR) data collected from a subject, so as to define a set of voxels defining a plurality of cluster seeds; (b) extracting the respective time activity curve (TAC) for dynamic PET/SPECT modalities or time varying signals in the case of dynamic CT/MRI, for each voxel based on the data; (c) selecting a subset of the cluster seeds defined by the grid as initial cluster centroids of a set of clusters; (d) assigning each TAC to a respective cluster in the set of clusters containing a nearest one of the cluster centroids in a time-activity coordinate system; (e) computing a respective average TAC for each cluster after step (d); (f) generating a parametric image based on the respective average TACs of step (e); (g) repeating steps (c) to (f) one or more times using respectively different subsets of the cluster seeds; and (h) averaging the parametric images generated by each realization of steps (c) to (f).

In some embodiments, a system comprises one or more non-transitory machine readable storage media containing a set of dynamic positron emission tomography (PET), single photon emission computed tomography (SPECT), computed tomography (CT) or magnetic resonance (MR) data collected from a subject, and computer program instructions. An image processing module is provided for processing PET, SPECT, CT or MR data. The image processing module is configured for: overlaying a grid on the set of dynamic PET, SPECT, CT or MR data, so as to define a set of voxels defining a plurality of cluster seeds; extracting the respective time activity curve (TAC) for dynamic PET or SPECT modalities or time varying signals in the case of dynamic CT or MR data, for each voxel based on the data; selecting a subset of the cluster seeds defined by the grid as initial cluster centroids of a set of clusters; assigning each TAC to a respective cluster in the set of clusters; computing a respective average TAC of each cluster; generating a parametric image based on the respective average TACs for the clusters; repeating the overlaying, determining, selecting, assigning computing and generating; and averaging the generated parametric images.

In some embodiments, a non-transitory machine-readable storage medium is encoded with computer program instructions, such that when a processor executes the computer program instructions, the processor performs a method comprising: (a) overlaying a grid on a set of dynamic positron emission tomography (PET), single photon emission computed tomography (SPECT), computed tomography (CT) or magnetic resonance (MR) data collected from a subject, so as to define a set of voxels defining a plurality of cluster seeds; (b) extracting a respective time activity curve (TAC) for dynamic PET or SPECT data or time varying signals in the case of dynamic CT or MR data, for each voxel based on the data; (c) selecting a subset of the cluster seeds defined by the grid as initial cluster centroids of a set of clusters; (d) assigning each TAC to a respective cluster in the set of clusters containing a nearest one of the cluster centroids in a time-activity coordinate system; (e) computing a respective average TAC for each cluster; (f) generating a parametric image based on the respective average TACs; (g) repeating steps (c) to (f) one or more times using respectively different subsets of the cluster seeds; and (h) averaging the parametric images generated by each realization of steps (c) to (f).

DETAILED DESCRIPTION

This description of the exemplary embodiments is intended to be read in connection with the accompanying drawings, which are to be considered part of the entire written description. The drawings are not to scale.

Whole-body parametric PET imaging along with Patlak graphical analysis has the potential to provide improved diagnosis. For patient comfort and economic reasons, short duration dynamic scan protocols are desirable. However, a voxel-based fitting approach for a short duration dynamic scan protocol results in high statistical noise in the parametric images.

This disclosure provides a framework for whole-body parametric PET using a clustering-based method, in order to produce smooth PET images with reduced noise. This disclosure provides direct reconstruction of parametric images using a technique that uses multiple realizations of clustering to help in reducing noise.

The method can also be used for other time-activity based medical imaging equipment, such as SPECT, as well as medical imaging equipment using time varying signals in the case of dynamic CT or MRI. For brevity of discussion, the examples below apply the method for clustering PET data. The method can be applied similarly to SPECT, CT and MRI data. In the cases of PET and SPECT data, TAC data (event counts) are clustered; in the case of CT and MRI data, signal values are clustered. Also, for brevity, examples are described in which FDG is used as a tracer. Other suitable tracer materials can be used.

Clustering belongs to the family of unsupervised segmentation techniques and has been used for region-of-interest delineation in dynamic PET and dynamic cardiac SPECT imaging. During clustering, voxels with similar temporal behavior are grouped together based on maximizing the inter-cluster distance. The resulting segmented data are averaged and fit to the desired model in order to obtain the parametric images. This results in images with blocky appearance and inaccuracies when few clusters are selected. On the other hand, as the number of clusters is increased to improve accuracy, noise increases. In some embodiments of this disclosure, multiple realizations of clustering are performed. In some embodiments of this disclosure, multiple realizations of the clustering are performed, and a unique set of initial cluster center seeds is used during each realization, and the TAC values for each realization are averaged to obtain less noisy images. The cluster seeds are a set of time-activity curves from grid locations (and not spatial positions).

Figure 1:
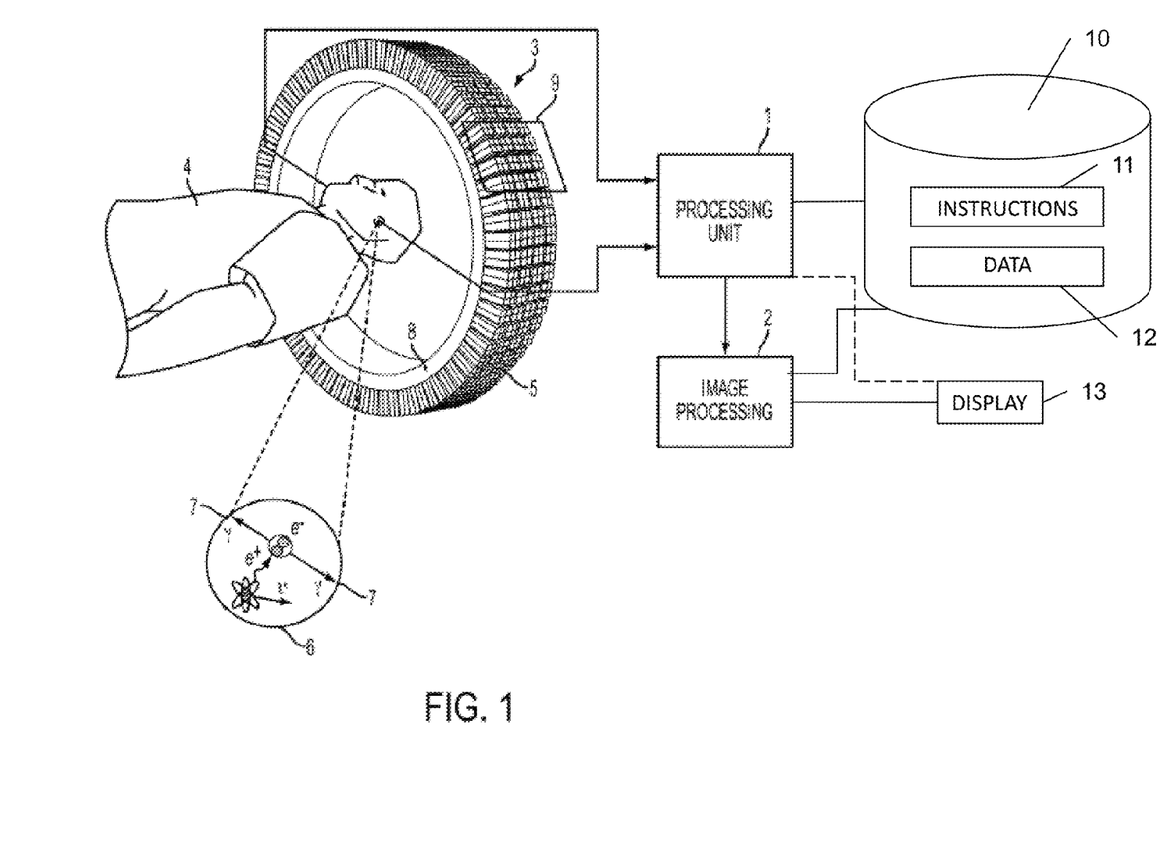
FIG. 1 is a schematic diagram of an exemplary PET system according to some embodiments.

FIG. 1 shows an embodiment of an exemplary PET system. A subject 4, for example a patient, is positioned within a detector ring 3 comprising photon detectors 5, such as photomultiplier tube (PMT), avalanche photodiodes (APD), silicon photomultiplier (SiPM) or the like. In front of the photon detectors 5 are individual crystals 8, also called detectors 8. A group of four photon detectors can have an array of detectors 8 in front of them. Each detector 8 can be an individual crystal in front of respective photon detectors. During an annihilation event, a positron and an electron are destroyed, and two gamma photons 7 are emitted in diametrically opposing directions, as shown in detail 6. These photons 7 are registered by the PET system as they arrive at detectors 8 in the detector ring 3. Data resulting from the photons 7 arriving at the detectors 8, are forwarded to a processing unit 1 which determines whether two registered events indicate an annihilation. All annihilation events are forwarded to the image processing unit 2 where the final image data can be produced by image reconstruction methods. The image processing unit 2 can be connected to a display 13 for displaying one or more processed images to a user. PET images show the concentration of a positron emitting substance throughout the patient over time.

The system can include a separate image processing unit 2, or the image processing unit can be incorporated to include a single processor 1 or a computer system coupled with servers through a communication network. In some embodiments, the computer system can include a non-transitory computer readable storage medium 10 encoded with computer program instructions 11 and data 12. The processor(s) 1, 2 are electrically coupled with the computer readable storage medium 10. The processor(s) 1, 2 can be configured to execute the computer program instructions 11 for executing image processing computations. The processors 1, 2 can include central processing unit (CPU), a multi-processor, a microprocessor, a microcontroller, a distributed processing system, application specific integrated circuitry (ASIC) and/or any suitable processing unit.

In some embodiments, the processor(s) 1, 2 include one or more non-transitory computer readable storage media 10, such as electronic, magnetic, optical, electromagnetic, infrared, a solid state memory (or apparatus or device). For example, the computer readable storage medium 10 can include a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium can include a compact disk-read only memory (CD-ROM), a digital video disc (DVD) or a Blue-Ray Disc Read-Only Memory (BD-ROM).

This disclosure provides a framework of a clustering based method for estimating parametric images with low statistical noise. In some embodiments, the method uses a k-means clustering technique for segmenting the time-activity curves (TAC) associated with each respective voxel within the whole-body volume. The TAC includes an activity value for the voxel at each image time, where the activity value represents a number of positron-electron annihilations detected within the voxel at a time an image is collected (e.g, by a gamma ray detector). By clustering voxels having similar TACs (indicating similar tracer uptake properties), and coloring the voxels according to their cluster, a PET image is generated in which the tracer uptake properties of various tissues are easily distinguishable.

Some embodiments use k-means clustering techniques. k-means clustering partitions n observations into k clusters, in which each observation belongs to the cluster with the nearest centroid. Given a set of observations $(x_1, x_2, \ldots, x_n)$ k-means clustering partitions the n observations into $k(\leq n)$ sets $S=\{S_1, S_2, \ldots, S_k\}$ so as to minimize the within-cluster sum of squares of (Euclidean) distance functions of each point in the cluster to the cluster center, which is given by:

$$\operatorname*{argmin}_{s} \sum_{i=1}^{k} \sum_{x \in S_i} \|x - \mu_i\|^2$$

where $\mu_i$ is the mean of points in $S_i$.

In some embodiments, clustering is based on a minimum Euclidian distance measure in TAC space. That is, clusters contain voxels having TAC values which are closer to each other than to the TAC values of voxels in other clusters. (Spatial proximity of voxels is not taken into account during this clustering, and is not used in the Euclidean distance computation.) The clustering identifies subsets of the voxels for which the PET image data show the same or similar uptake behavior.

The tracer activity concentration in both the blood plasma, Cp(t), and the tissue, C(t), are measured over time (in terms of TAC values) and the TAC are extracted. To obtain improved accuracy without increasing noise, multiple realizations of clustering are performed on the same population of image data. During each realization, cluster center seeds are selected from a unique ordered set of time-activity curves within the whole body volume. All the remaining data are classified into the clusters defined by these cluster center seeds. The clustering analysis is performed in multiple realizations using the same total set of image data, but different cluster center seeds for each realization. In some embodiments, a uniform grid is overlaid on the whole body to be imaged, and the cluster center seeds are selected from intersection points on this grid. In each successive realization, the grid is offset with respect to the body, and seeds are selected from intersection points along the grid, so the locations of the cluster center seeds are varied to mitigate any errors due to use of redundant data. In some embodiments, each realization uses a respectively different subset of the collected data, to reduce inaccuracy introduced by repeated selection of cluster center seeds from points on the grid.

In each realization, Patlak analysis is performed on each cluster average to form the slope and intercept images. In the Patlak analysis, the tracer metabolic rate is estimated by applying linear regression to the Patlak equation for t≥t* (t* is the time after which relative equilibrium is attained between the vascular space and reversible tissue compartment)

$$\frac{C(t)}{C_p(t)} = K_i \frac{\int_0^t C_p(\tau)d\tau}{C_p(t)} + V, t \geq t^*$$

where Ki and V are the slope and intercept of linear regression, respectively. Ki represents the tracer influx or uptake rate constant in the tissue, and V is the total blood plasma distribution volume. This greatly simplifies the computations relative to a multi-compartment model that takes into account transient effects immediately after injection of the tracer.

Parametric images obtained for all realizations are averaged to form the final images. This multiple-clustering-realizations method has the potential to provide improved parametric image quality for short scan whole-body parametric PET imaging. The averaging reduces artifacts introduced by the use of limited number of clusters, while suppressing noise and reducing bias.

Figure 2:
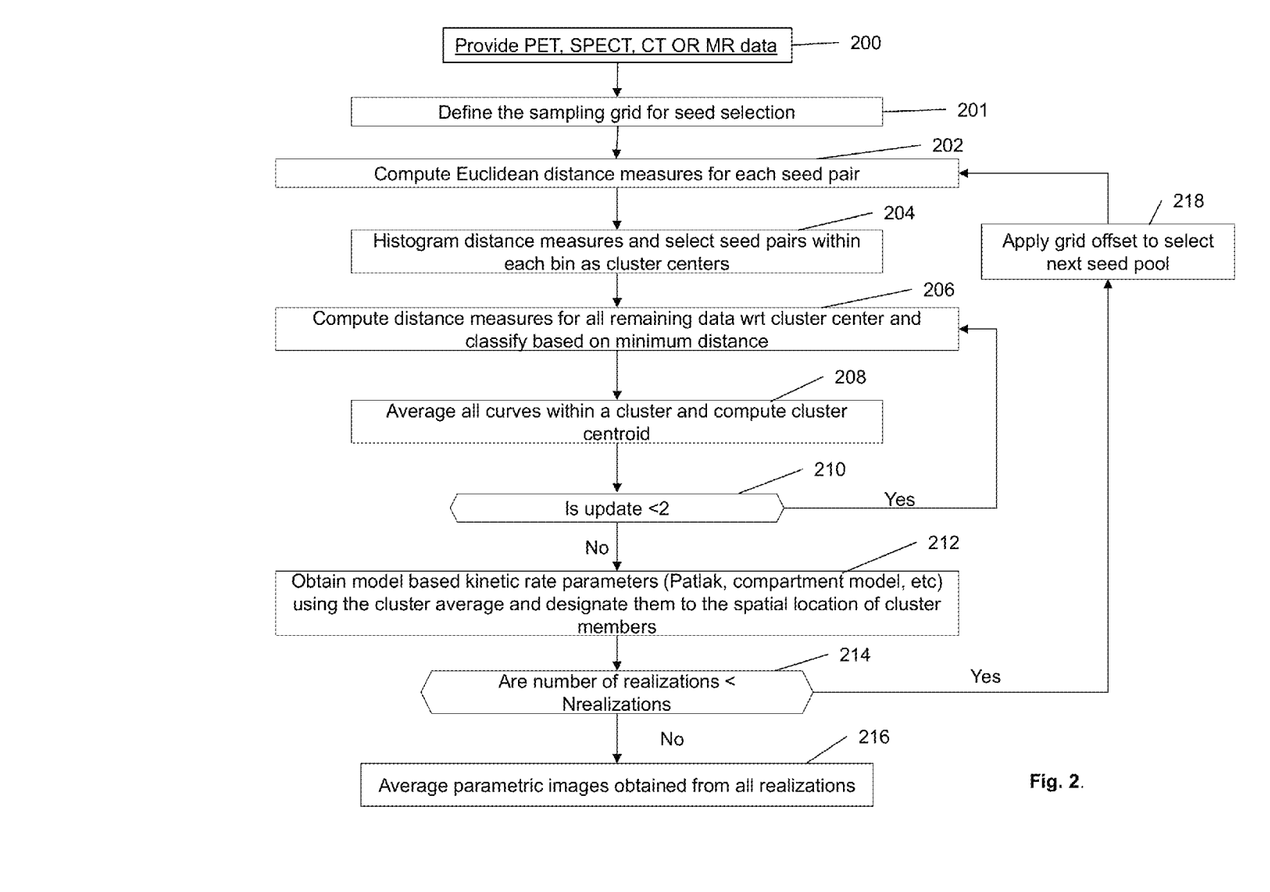
FIG. 2 is a flow chart of a clustering method for image data collected by the PET system of FIG. 1.

FIG. 2 is a flow chart of an embodiment of the clustering based method performed by the image processing unit 2.

At step 200, a set of PET, SPECT, CT or MRI image data is provided. The image data are collected using a collection system, such as a gamma camera or PET system in the case of PET image data. At the time of collection, the image data are stored in a machine readable storage medium, such as memory, a hard disk drive, an optical disk drive, tape, or the like.

At step 201, a sampling grid is defined for seed selection. In some embodiments, the user selects a fraction f of the total collected image data. The fraction f can be a rational number between zero and one. Typically, the total amount of data collected from each PET, SPECT, CT or MRI image is too large to use every collected point due to computational time and complexity. The inventor has determined that the present method is effective with a fraction f between 0.01 and 0.05.

According to some embodiments, a uniformly spaced sampling grid is computed for the whole-body volume containing N samples where N=f*number of voxels within the patient volume. Here f is the fraction of data used and depends upon the spread of dynamics of the underlying data.

For example, assume a 100 mm×100 mm collected image (with voxel spacing of 1 mm) has an area of 10000 mm². If the fraction f=0.01, the grid is a 10×10 grid with a grid point every 10 mm, and there will be 100 voxels total in the grid.

In this example, a uniform grid size is used. The uniform grid size allows the method to be used to select cluster seeds without any advance knowledge of the distribution of the time-activity data. As explained below, the use of a different seed set for each realization avoids artifacts and noise due to location of the grid relative to the body that is imaged.

The temporal samples for each point on the grid are then extracted from the dynamic image set to form time-activity curves which are designated as seeds. For example, if images are collected at time t=10, 15, 20, 25 and 30, then each voxel has five activity values corresponding to those five times.

At step 202, the Euclidean distance measure ($d_{ab}$) between the time-activity value of each seed pair is computed as:

$$d_{ab} = \sqrt{\sum_{i=1}^{n}(\overline{x_{ai}} - \overline{x_{bi}})^2} \text{ where } x_a \neq x_b$$

where n is the number of temporal samples and $x_a$ and $x_b$ are time-activity curves of each seed.

At step 204, the seed pairs' distance measures obtained in step 202 are histogrammed into ($N_{clus}/2$) bins, where $N_{clus}$ is the number of clusters. The user selects the number of clusters $N_{clus}$ based on experience to represent the number of types of tissue having distinct uptake characteristics, which will appear in the image. The bin size is a normalized distance value. Each bin size equals (sum of all distance measures)/($N_{clus}/2$). The pairs of seeds centered within each bin are selected and initialized as cluster centers.

At step 206, the time-activity curves from the remaining voxels (other than the points selected as cluster centers) of the dynamic whole-body volume images are extracted. For each curve (i.e., voxel time activity curve), Euclidean distance (in the activity space) is computed for the respective voxel with respect to the time activity curve value of the voxel at each cluster center, and assigned to clusters based on minimum distance between that voxel and any of the cluster centroids.

At step 208, once all the time-activity curves (and their corresponding voxels) are classified (according to their time-activity values) and assigned to respective clusters, an average curve (i.e., best fit regression curve) for each cluster is obtained to form the cluster centroid. Using the newly computed cluster centroid, the time-activity curves are once again classified followed by centroid re-computation.

At step 210, when the cluster centroids have been computed twice, step 212 is performed. In other embodiments, the loop of steps 206 and 208 is repeated until a predetermined criterion is met. For example, in some embodiments, step 206 can result in one or more voxels being moved from a first cluster to a second cluster; the criterion is met when performance of step 206 does not result in any of the voxels being moved from one cluster to another.

At step 212, the model based kinetic rate parameters for each cluster are computed. In some embodiments, Patlak analysis is performed on each cluster centroid. The resulting TAC slope and intercept obtained for each cluster is assigned to the spatial location of all members belonging to the given cluster. This in turn results in slope and intercept parametric images.

At step 214, if the number of realizations of the clustering method is fewer than a predetermined number $N_{realizations}$ selected by the user, then step 218 is performed, and the loop from steps 202 to 214 is repeated until the predetermined number of realizations of the clustering have been performed.

Figure 3:
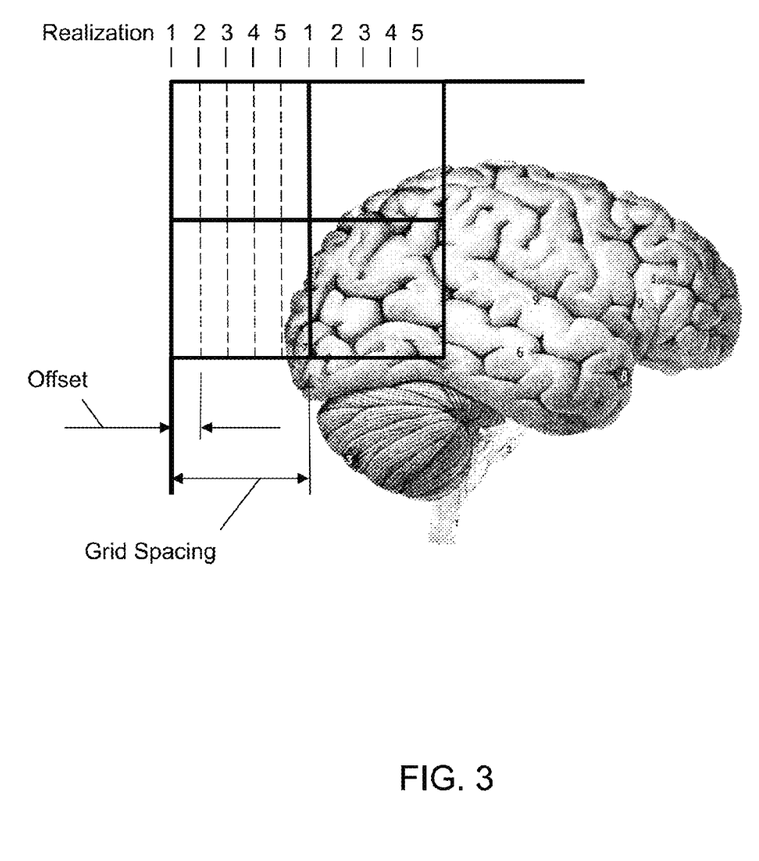
FIG. 3 is a schematic diagram showing the grid offset used in the method of FIG. 2.

At step 218, the grid offset is applied to select the next seed pool. FIG. 3 is a two-dimensional schematic diagram showing the relationships between the grid and the object, and between the grid and the offset. In FIG. 3, a corner of the grid overlaid on the body to be imaged during the first realization of clustering is indicated by solid grid lines. While FIG. 3 shows the two-dimensional representation of the sampling grid, in reality the clinical data used is in three-dimensions. The entire grid extends in X, Y and Z directions to encompass the entire object to be imaged. As noted above, the original image data may include 400 to 10,000 voxels within each square (cube in 3D) shown by solid lines, corresponding to a fraction f of data used along each axis between 0.05 and 0.01, respectively. The initial cluster seed samples are selected from the voxels at the intersection of the grid lines (shown in solid lines). Note that the seeds are selected using a uniform grid in the spatial domain, but the clustering is performed in the TAC domain.

During each realization, a new sampling grid is obtained by applying an offset to the entire grid with respect to the body to be imaged. For example, in FIG. 3, five realizations of clustering are performed. The grid spacing is divided by the number of realizations to obtain the offset. Before each of the second and subsequent realizations, the entire grid is offset by this distance, and the voxels at each intersection of the grid lines (in the spatial domain) are used as the new set of cluster seeds, and clustering is performed in the TAC domain. The dashed lines labeled "2" are the locations of the grid lines during the second realization; The dashed lines labeled "3" are the locations of the grid lines during the third realization, and so forth. The offset is calculated as:

Offset=spacing between grid/(number of realizations).

Figure 4:
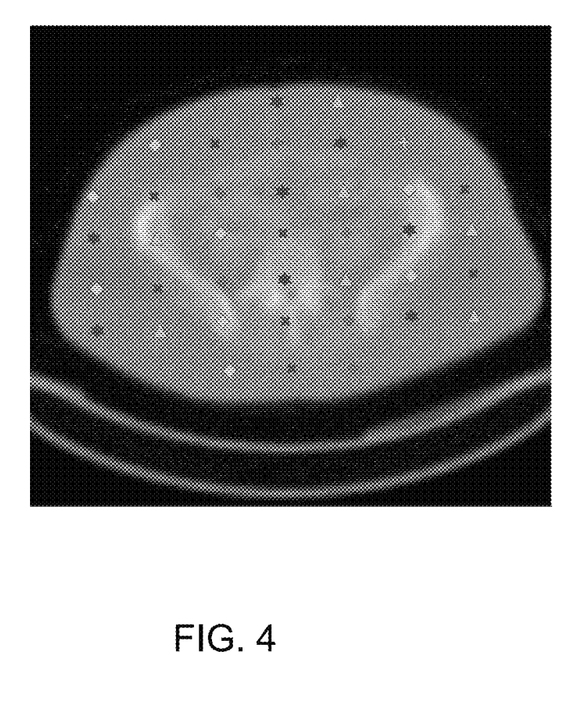
FIG. 4 is a diagram of a seed grid overlaid on an image.

This ensures uniform coverage of the patient volume. An illustration of this procedure in two-dimension is shown in FIG. 4. FIG. 4 shows a sampling grid overlaid on a transaxial view of the attenuation map shown in two-dimensions. Each set of shapes (diamond, star, triangle, X, plus) indicate the sampling grid used for a respective realization.

Although the example in FIG. 4 appears to show the same subset of the grid points being selected as cluster seeds during each realization, in other examples, respectively different subsets of the grid points can be selected as seeds during two or more realizations of clustering. During each realization, steps 202 and 204 are performed for every pair of grid points. Because the grid is offset by a distance smaller than the grid pitch with each successive realization, each realization uses a different sample of the PET data. The existence of noise and/or local maxima or minima can cause the histogramming in step 204 to result in selection of voxels corresponding to different grid points as seeds in different realizations.

Steps 202-214 are repeated by applying the offset to the grid and using the next set of seeds. At the end of each realization the parametric images obtained are averaged with the respective previous estimate. In some embodiments, five clustering realizations are performed. The averaging operation is the arithmetic mean of parametric images obtained for all realizations.

Thus, beginning with a time series of images and through each clustering realization a single parametric image is obtained. Different parametric images are obtained by repeating the clustering operation (realizations) by offsetting the grid and choosing new cluster seeds. Then all the obtained parametric images are averaged to get the final image. This can also be considered the average time-activity curve obtained from averaging of cluster centroids (to which the TAC belongs) obtained during each realization. The final image is displayed on the display device 13 and/or stored in the non-transitory, machine readable storage medium 10.

Validation

The method described above was validated using XCAT phantom based simulations, and XCAT phantom data as described in Segars, W. P. et al., "4D XCAT phantom for multimodality imaging research", Med Phys. 2010 September; 37(9): 4902-4915. In addition, 5 whole-body patient datasets acquired with a dynamic protocol were also used for evaluation. XCAT phantom based simulations for the torso were performed using dynamic time-activity curves to model FDG uptake. Five dynamic images each representing 1 minute scan time with 7 minute intervals were created starting 60 minutes post injection. In addition, 5 whole-body dynamic FDG patient datasets with image-derived blood input function and dynamic data measurements similar to the simulated data were also used. All dynamic data were reconstructed using ordered subset expectation maximization (OSEM) applying corrections for image-degrading factors. Slope and intercept parametric images were obtained for the voxel-fitting and clustering method. Noise and bias averaged in a liver and lung region of interest increased as a function of the number of clusters for the simulated data. However, as number of clustering realizations was increased, noise and bias reduced and image quality improved. The parametric images obtained with the clustering method showed significantly better image quality compared to voxel-based fitting method for the patient datasets.

XCAT Simulations

An XCAT phantom was used to simulate dynamic FDG data for the torso. Time-activity curves for different tissues in the torso were generated using a two tissue compartment model to represent the tissue FDG uptake. The kinetic rate parameters used were obtained. In addition, two lesions—one located in liver and the other in the mediastinum region—were also simulated. Five dynamic frames each representing 1 minute scan duration and 7 minutes interval within frames were generated starting 60 minutes post injection. Decay correction and calibration factors were incorporated in the data in order to represent measurements from an mCT scanner. Each dynamic frame was forward projected along with modelling of image degradation factors such as attenuation, scatter, randoms and point spread function to create a realistic sinogram. Poisson noise was added to the simulated prompts as well as randoms sinograms. Reconstruction of each dynamic frame was performed using 3 iterations of OSEM with 21 subsets.

The multiple clustering realizations method described above was used on the reconstructed dynamic frames. A mask derived from the attenuation map was used to define the volume of interest to be clustered. Clustering was performed by varying the number of clusters (2-20) and the number of realizations (1-5). A volume of interest in the liver and the lung was used to obtain the normalized standard deviation to quantify noise as well as the bias relative to the simulated values.

Patient Data

Five whole-body patient datasets acquired with a dynamic acquisition were used for evaluation. Each dataset used a single bed position (over the torso) list-mode acquisition for the first 6 minutes so as to capture the shape of the blood input function. 15 dynamic whole-body acquisitions were performed starting 10 minutes post-injection. Each single bed was acquired for 45 seconds and 7 beds were required to complete a whole-body acquisition.

The list-mode data was histogrammed in order to obtain a series of sinograms including twelve 10 second samples and twelve 20 second samples. Each sinogram was reconstructed using OSEM (3 iterations and 21 subsets) correcting for attenuation, scatter and point spread function (PSF). The blood pool activity from the left ventricle was used to obtain the input function. Parametric images were obtained using the voxel-based fitting as well as the multiple clustering realizations method.

Figure 5A:
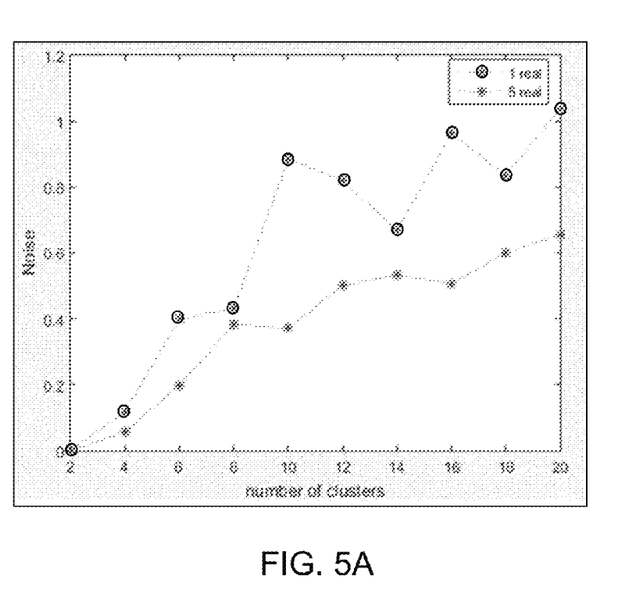
FIGS. 5A and 5B show how noise and bias are affected by number of clusters and number of realizations of clustering.
Figure 5B:
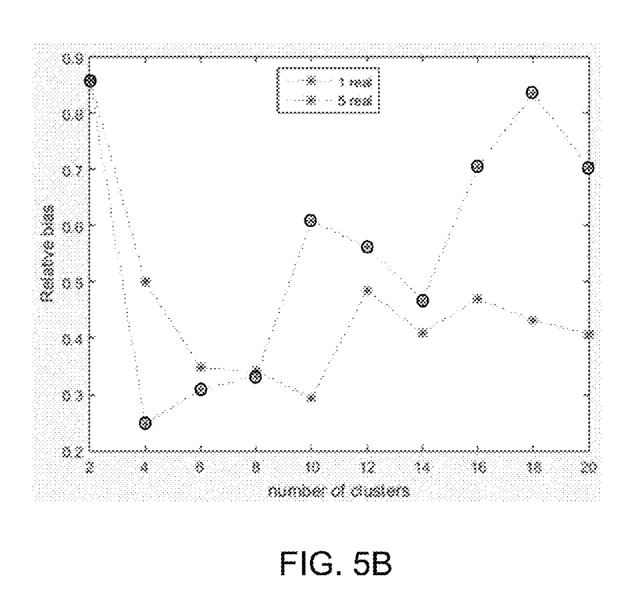

FIGS. 5A and 5B show noise and bias measures averaged in the liver and lung ROI for the simulated data as a function of number of clusters. As shown in FIG. 5A, as the number of clusters is increased, noise increases. On the other hand, as shown in FIG. 5B, bias is higher when fewer clusters (fewer than 6) are used but increases for large number of clusters due to propagation of noise. However, as the number of realizations are increased, the noise and bias are both reduced. The slope image obtained with 18 clusters and 5 realizations was found to give acceptable noise and bias and chosen as the baseline.

Figure 6A:
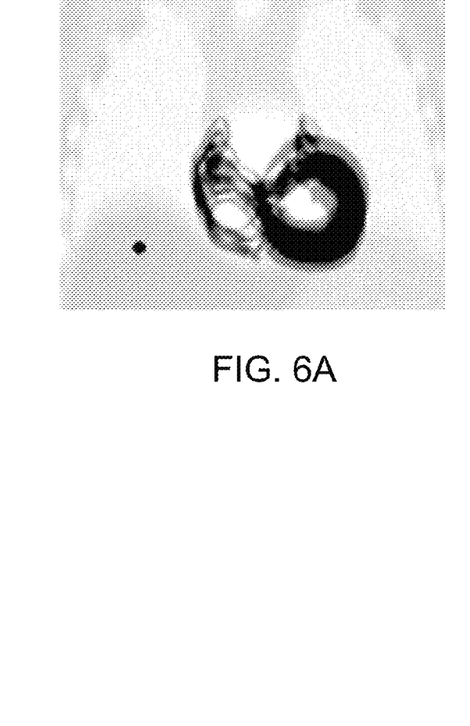
FIG. 6A shows a true slope image of a coronal view using XCAT Phantom data.
Figure 6B:
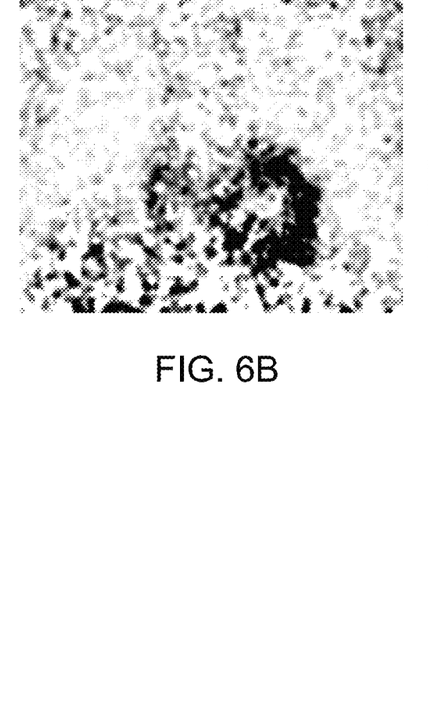
FIG. 6B shows a voxel fit slope image data of a noisy realization of FIG. 6A.
Figure 6C:
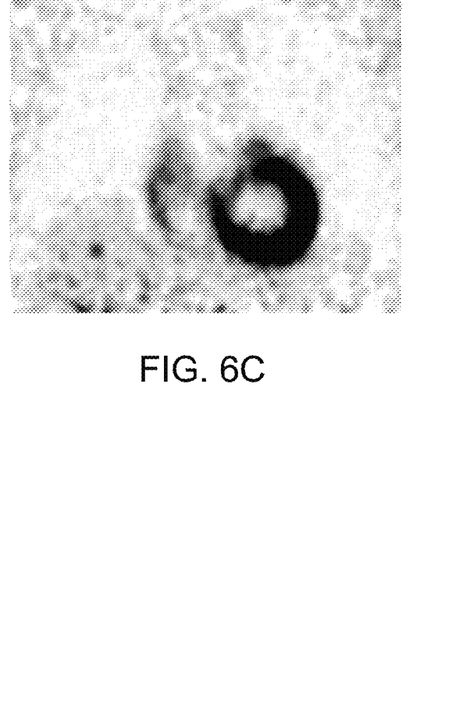
FIG. 6C shows a clustering method slope image for noisy simulated data as used in FIG. 6B.

FIG. 6A shows a true parametric image. FIG. 6B shows the reconstructed parametric image obtained with voxel-wise fitting. FIG. 6C shows reconstructed parametric images obtained using the multiple clustering realizations method described above. Gaussian post-smoothing was performed on the slope parametric image obtained with the multiple-clustering-realizations method described above. Image quality with clustering greatly improved over standard voxel-based fitting.

Figure 7A:
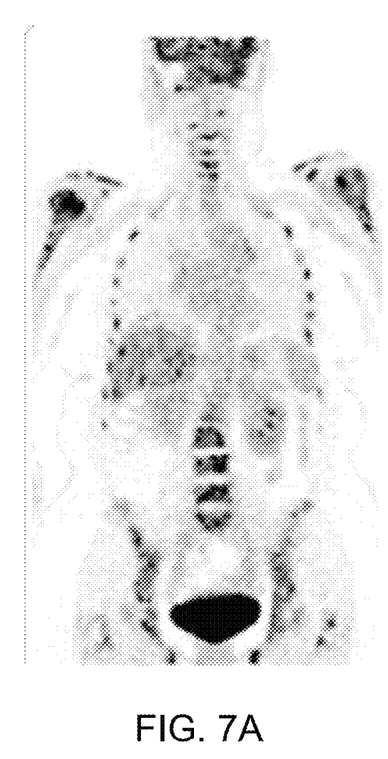
FIG. 7A shows the static PET image of a coronal view using patient data.
Figure 7B:
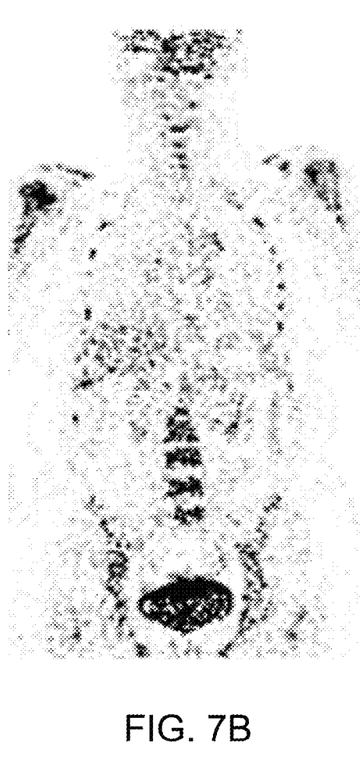
FIG. 7B shows a voxel fit slope image for dynamic PET data of FIG. 7A.
Figure 7C:
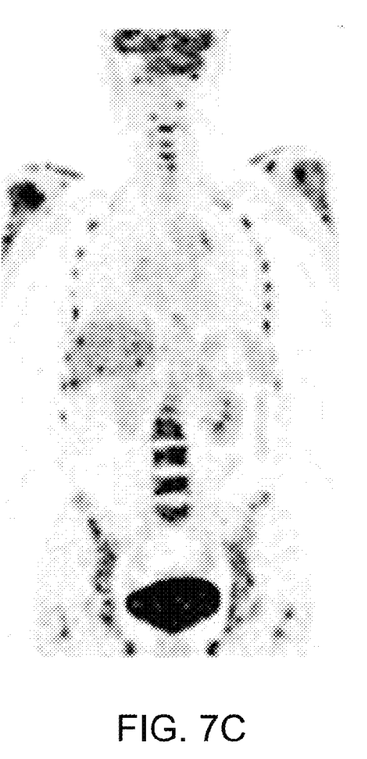
FIG. 7C shows a clustering method slope image for dynamic PET data as used in FIG. 7B.

FIGS. 7A-7C show the static and parametric images for a patient study. The use of multiple clustering realizations method (15 clusters; 5 realizations) provided good noise suppression without affecting lesion contrast. FIG. 7A is a coronal view of the static image. FIG. 7B shows parametric image obtained with voxel fit slope, and FIG. 7C shows parametric image obtained with the clustering method for the same patient dataset.

The methods described above, offers an alternative method of post-smoothing for parametric images by operating in the temporal domain. Using the average of the parameter estimates provides images with low background noise and boosts tumor contrast. Use of multiple clustering iterations reduces blocky appearance as well as suppresses background and boosts tumor contrast.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

What is claimed is:

1. A method, comprising:
   (a) overlaying a grid on a set of dynamic positron emission tomography (PET), single photon emission computed tomography (SPECT), computed tomography (CT) or magnetic resonance (MR) data collected from a subject, so as to define a set of voxels defining a plurality of cluster seeds;
   (b) extracting a respective time activity curve (TAC) for dynamic PET or SPECT data or time varying signals in the case of dynamic CT or MR data, for each voxel based on the data;
   (c) selecting a subset of the cluster seeds defined by the grid as initial cluster centroids of a set of clusters;
   (d) assigning each TAC to a respective cluster in the set of clusters containing a nearest one of the cluster centroids in a time-activity coordinate system;
   (e) extracting a respective average TAC for each cluster after step (d);
   (f) generating a parametric image based on the respective average TACs of step (e);
   (g) repeating steps (c) to (f) one or more times using respectively different subsets of the cluster seeds;
   (h) averaging the parametric images generated by each realization of steps (c) to (f); and
   (i) providing a noise-reduced image based on a result of the averaging.

2. The method of claim 1, wherein the grid is a uniformly spaced grid.

3. The method of claim 2, wherein step (g) includes, for each repeating of steps (c) to (f):
   offsetting the grid with respect to spatial coordinates of the PET or SPECT data, and
   selecting a subset of the plurality of cluster seeds having a constant location relative to the offset grid.

4. The method of claim 3, wherein each time steps (c) to (f) are repeated, the grid is offset by a uniform distance.

5. The method of claim 4, wherein the uniform distance is a quotient of a grid spacing of the grid divided by N, where N is a number of times steps (c) to (f) are repeated.

6. The method of claim 1, wherein the selecting in step (c) includes:
   computing a distance between each pair of cluster seeds in a time-activity domain within the plurality of cluster seeds;

selecting a number of clusters;
histogramming the distance measures so as to have a bin width with equal sum of distance measures;
selecting a respective pair of cluster seeds at a respective center of each bin as the initial cluster centroids.

7. The method of claim 6, wherein the number of bins is one half of the selected number of clusters.

8. The method of claim 1, wherein the step of determining a respective TAC for each voxel includes a Patlak analysis.

9. The method of claim 1, wherein, during each realization of steps (c) to (f), step (d) is repeated and a centroid of each cluster is updated after each performance of step (d), until step (d) is performed without any of the TACs changing from one of the set of clusters to another of the set of clusters.

10. The method of claim 1, wherein each of the TACs is based on a respective linear model.

11. The method of claim 1, wherein step (d) uses a k-means clustering method.

12. A system comprising:
one or more non-transitory machine readable storage media containing a set of dynamic positron emission tomography (PET) or single photon emission computed tomography (SPECT), computed tomography (CT) or magnetic resonance (MR) data collected from a subject, and computer program instructions;
an image processing module for processing PET, SPECT, CT or MR data, the image processing module configured for:
overlaying a grid on the set of dynamic PET, SPECT, CT or MR data, so as to define a set of voxels defining a plurality of cluster seeds;
extracting a respective time activity curve (TAC) for dynamic PET or SPECT data or time varying signals in the case of dynamic CT or MR data, for each voxel based on the data;
selecting a subset of the cluster seeds defined by the grid as initial cluster centroids of a set of clusters;
assigning each TAC to a respective cluster in the set of clusters;
computing a respective average TAC of each cluster;
generating a parametric image based on the respective average TACs for the clusters;
repeating the overlaying, determining, selecting, assigning, computing, and generating;
averaging the generated parametric images; and
providing a noise-reduced image based on a result of the averaging.

13. The system of claim 12, wherein:
the grid is a uniformly spaced grid, and
the selecting comprises offsetting the grid with respect to spatial coordinates of the PET or SPECT data, and selecting a subset of the plurality of cluster seeds having a constant location relative to the offset grid.

14. The system of claim 13, wherein the grid is offset by a uniform distance before each repeating, and the uniform distance is a quotient of a grid spacing of the grid divided by N, where N is a number of times the repeating is performed.

15. The system of claim 12, further comprising an array of detectors which are responsive to gamma photons.

16. A non-transitory machine-readable storage medium encoded with computer program instructions, such that when a processor executes the computer program instructions, the processor performs a method comprising:
(a) overlaying a grid on a set of dynamic positron emission tomography (PET) or single photon emission computed tomography (SPECT), computed tomography (CT) or magnetic resonance (MR) data collected from a subject, so as to define a set of voxels defining a plurality of cluster seeds;
(b) extracting a respective time activity curve (TAC) for dynamic PET or SPECT data or time varying signals in the case of dynamic CT or MR data, for each voxel based on the data;
(c) selecting a subset of the cluster seeds defined by the grid as initial cluster centroids of a set of clusters;
(d) assigning each TAC to a respective cluster in the set of clusters containing a nearest one of the cluster centroids in a time-activity coordinate system;
(e) computing a respective average TAC for each cluster;
(f) generating a parametric image based on the respective average TACs;
(g) repeating steps (c) to (f) one or more times using respectively different subsets of the cluster seeds; and
(h) averaging the parametric images generated by each realization of steps (c) to (f); and
(i) providing a noise-reduced image based on a result of the averaging.

17. The non-transitory machine-readable storage medium of claim 16, wherein:
the grid is a uniformly spaced grid; and
step (g) includes, for each repeating of steps (c) to (f):
offsetting the grid with respect to spatial coordinates of the PET or SPECT data, and
selecting a subset of the plurality of cluster seeds having a constant location relative to the offset grid.

18. The non-transitory machine-readable storage medium of claim 16, wherein each time steps (c) to (f) are repeated, the grid is offset by a uniform distance.

19. The non-transitory machine-readable storage medium of claim 18, wherein the selecting in step (c) includes:
computing a distance in time-activity space between each pair of cluster seeds within the plurality of cluster seeds;
selecting a number of clusters;
histogramming the distance measures so as to have a bin width with equal sum of distance measures;
selecting a respective pair of cluster seeds at a respective center of each bin as the initial cluster centroids.

20. The non-transitory machine-readable storage medium of claim 16, during each realization of steps (c) to (f), step (d) is repeated and a centroid of each cluster is updated after each repeating of step (d), until step (d) is performed without any of the TACs changing from one of the set of clusters to another of the set of clusters.

* * * * *